United States Patent
Williams et al.

(10) Patent No.: US 6,238,582 B1
(45) Date of Patent: May 29, 2001

(54) REACTIVE ION BEAM ETCHING METHOD AND A THIN FILM HEAD FABRICATED USING THE METHOD

(75) Inventors: Kurt E. Williams, Flushing; Boris L. Druz, Brooklyn; Danielle S. Hines, Mount Kisco; Jhon F. Londono, Mineola, all of NY (US)

(73) Assignee: Veeco Instruments, Inc., Plainview, NY (US)

( * ) Notice: Subject to any disclaimer, the term of this patent is extended or adjusted under 35 U.S.C. 154(b) by 0 days.

(21) Appl. No.: 09/281,663

(22) Filed: Mar. 30, 1999

(51) Int. Cl.[7] .............................. C03C 15/00; C03C 25/06

(52) U.S. Cl. .............................. 216/22; 216/66; 438/707; 438/712

(58) Field of Search .................... 216/22, 27, 66, 216/67; 438/707, 712

(56) References Cited

U.S. PATENT DOCUMENTS

| | | | |
|---|---|---|---|
| 3,913,320 | 10/1975 | Reader et al. | 60/202 |
| 4,142,958 | 3/1979 | Wei et al. . | |
| 4,490,229 | 12/1984 | Mirtich et al. | 204/192 |
| 4,739,214 | 4/1988 | Barr | 313/362.1 |
| 4,778,561 | 10/1988 | Ghanbari | 156/643 |
| 4,791,719 | 12/1988 | Kobayashi et al. | 29/603 |
| 4,883,467 | 11/1989 | Franetzki et al. | 604/152 |
| 5,198,634 | 3/1993 | Mattson et al. . | |
| 5,198,718 | 3/1993 | Davis et al. | 313/359.1 |
| 5,274,306 | 12/1993 | Kaufman et al. | 315/111.41 |
| 5,281,302 | 1/1994 | Gabric et al. . | |
| 5,376,225 | * 12/1994 | Wakabayashi et al. | 438/690 |

(List continued on next page.)

FOREIGN PATENT DOCUMENTS

| | | |
|---|---|---|
| 0 871 200 | 10/1998 | (EP) . |
| 10 112007 | 4/1998 | (JP) . |
| 10 143817 | 5/1998 | (JP) . |
| 95/23652 | 9/1995 | (WO) . |

OTHER PUBLICATIONS

Patent Abstracts of Japan, vol. 1998, No. 9, Jul. 31, 1998.
Patent Abstracts of Japan, vol. 1998, No. 10, Aug. 31, 1998.
PCT International Search Report (PCT/US00/08400).

(List continued on next page.)

*Primary Examiner*—William Powell
(74) *Attorney, Agent, or Firm*—Morgan & Finnegan, L.L.P.

(57) ABSTRACT

A reactive ion beam etching method which employs an oxidizing agent in a plasma contained in an ion source to control carbonaceous deposit (e.g., polymer) formation within the ion source and on the substrate. During operation of an ion source, after operating the ion source with a plasma having a carbonaceous deposit forming species, a plasma containing an oxidizing agent (species) is generated within the ion source. Preferably, within the ion source a plasma is maintained essentially continuously between the time that the carbonaceous deposit forming species is present and the time that the oxidizing agent is present. A reactive ion beam extracted from an ion source containing a plasma having an oxidizing species may be impinged onto a sample substrate to remove (i.e., etch) any carbonaceous material deposits (e.g., polymers) formed on the sample, such as may be formed from previous reactive ion beam etching (RIBE) processing steps using an ion beam having species which may form carbonaceous (e.g., polymer) deposits on the sample substrate structure. Preferably, a reactive ion beam containing an oxidizing species is incident upon the sample at an angle which enhances the selectivity of the carbonaceous deposit (e.g., polymer) etching relative to other materials upon which the ion beam impinges. A thin film magnetic head is fabricated according to a pole trimming process which employs RIBE with an oxidizing species to remove any carbonaceous material (e.g., polymer) deposits formed during a previous fluorocarbon based RIBE step.

89 Claims, 9 Drawing Sheets

U.S. PATENT DOCUMENTS

| | | | |
|---|---|---|---|
| 5,438,747 | | 8/1995 | Krounbi et al. ......................... 29/603 |
| 5,455,081 | * | 10/1995 | Okada et al. ....................... 216/66 X |
| 5,508,368 | | 4/1996 | Knapp et al. ......................... 427/534 |
| 5,607,599 | | 3/1997 | Ichihara et al. . |
| 5,770,100 | | 6/1998 | Fukuyama et al. . |
| 5,867,890 | | 2/1999 | Hsiao et al. . |
| 5,874,010 | * | 2/1999 | Tao et al. ............................ 216/66 X |
| 5,878,481 | | 3/1999 | Feng et al. . |
| 5,938,941 | | 8/1999 | Ishiwata et al. . |
| 5,949,625 | | 9/1999 | Sato et al. . |
| 6,004,437 | * | 12/1999 | Lee et al. ............................ 216/66 X |

OTHER PUBLICATIONS

Extracts from Bernhard Wolf (ed.) *Handbook of Ion Sources*, CRC Press, Inc., Boca Raton, FL (1995).Loeb et al, "State–of–the–Art of the Rit–On Thrusters and Their Spin Offs", preprint IAF–88–258, 39$^{th}$ Congress of the International Astronautical Federation, Oct. 8–15, 1988/Bangalore, India.

Sol Aisenberg and Ronald Chabot, "Ion–Beam Deposition of Thin Films of Diamondlike Carbon", Journal of Applied Physics, vol. 42, No. 7, Jun. 1971, pp. 2953–2958.

James M.E. Harper, "Ion Beam Deposition", *Thin Film Processes*, Academic Press, Inc. 1978, pp. 175–206.

M. Hanazono, S. Narishige, and K. Kawakami, "Fabrication of a thin film head using polyimide resin and sputtered Ni–Fe films", J. Appl. Phys,53(3), Mar. 1982, pp. 2608–2610.

Bruce A. Banks and Sharon K. Rutleged, "Ion Beam Sputter Deposited Diamondlike Films Films", NASA Technical Memorandum 82873, prepared for mtg of Grtr NY Chapter of American Vacuum Society, Yocktown Heights, NY, Jun. 2, 1982.

L. David Bolinger, "Ion Beam Etching with Reactive Gases", Solid State Technology, Jan. 1983, pp. 99–108.

M. Hanazono, S. Narishige, S. Hara, K. Mitsuoka, K. Kawakami and Y. Sugita; S. Kuwatsuk, T. Kobayashi, M. Ohura and Y. Tsuji, "Design and fabrication of thin–film heads based on a dry process", J.Appl.Phys.61(8), Apr. 15, 1987, pp. 4157–4162.

H. W. Loeb, J. Freisinger, K.H. Groh and A. Scharmann, "State–of–the–Art of the Rit–Ion Thrusters and their Spin–Offs", 39$^{th}$ Congress of the International Astronautical Federation, Oct. 8–15, 1988, Bangalore, India.

Takashi Kawabe, Moriaki Fuyama, and Shinji Narishige, "Selective Ion Beam Etching of $Al_2O_3$ Films" J. Electrochem. Soc., vol. 138, No. 8, Sep. 1991, pp. 2744–2748.

T. Kawabe, M. Fuyama, S. Narishige and Y. Sugita, "Fabrication of Thin Film Inductive Heads with Top Core Separated Structure", IEEE Transaction on Magnetics, vol. 27, No. 6 Nov. 1991, pp. 4935–4938.

Lien–Chang Wang, Gary Halada, and Richard J. Gambino, "Radio frequency ion beam deposition of diamond–like carbon for sliders and heads", J.Appl.Phys. 78(8), Apr. 15, 1996.

* cited by examiner

REACTIVE ION BEAM ETCHING METHOD AND A THIN FILM HEAD FABRICATED USING THE METHOD

CROSS-REFERENCE TO RELATED APPLICATIONS

This application is related to commonly assigned, copending application Ser. No. 09/270998, filed Mar. 17, 1999, entitled "A Method For a Repetitive Ion Beam Processing With a By Carbon Containing Ion Beam", to Boris L. Druz et al., which is herein incorporated by reference.

BACKGROUND OF THE INVENTION

1. Technical Field

The present invention relates generally to ion beam etching, and more particularly to a reactive ion beam etching method using both carbonaceous species and oxidizing species, as well as to a thin film magnetic head fabricated using the reactive ion beam etching method.

2. Background Art

Ion beam etching (IBE) and reactive ion beam etching (RIBE) techniques have been used in research and multiple niche applications over the last 15–20 years. In the last five years, "ion milling" techniques have been extensively employed in the manufacture of thin film magnetic heads (TFMHs) for the data storage industry. The important advantages of ion milling over other etching techniques are excellent etch uniformity and control of etch feature profiles.

Recent trends in the thin-film head industry, including shrinkage of the head (slider) form factor and the introduction of high-sensitivity magnetoresistive read elements, have driven the need for anisotropic etching techniques with high selectivity and/or etch control combined with high throughput, reproducibility (repeatability), and yield. Until recently, high-throughput production operations and the deployment of RIBE processes have been hampered by the short filament life and reliability problems of the standard Kaufman-type ion sources, particularly when operated with high concentrations of reactive gases. These problems have been eliminated with the introduction of filamentless ion sources, such as the RF inductively coupled plasma, (RF-ICP) ion source.

The most competitive alternative technique is reactive ion etching (RIE), which is widely used in the semiconductor industry. In RIE, the substrate is mounted inside the plasma reactor and directional etching is accomplished by applying an electrical bias to the substrate. This allows, in principle, high etch rates and selectivity using reactive plasmas. Optimum results are obtained for RIE processes when the surface to be etched is reacted with a chemical species in the plasma to form volatile reaction products which are pumped out of the system. However, data storage device materials are not highly reactive, and the reactive gas chemistries that have been found for these materials do not easily produce volatile reaction products. Oxide/metal etch selectivities are typically of the order of 10:1, but some of the useful RIE gases also attack photoresist, resulting in poor etch selectivity to resist masks. In addition, etch anisotropy can be poor and the production of unetched residues can result in rough etched surfaces and performance problems. For etching TFMH materials, IBE or RIBE can provide superior etch profiles, and RIBE selectivities and etch rates can be competitive with RIE.

The advantages of "ion milling" or IBE have been described throughout the literature, and include independent control of ion beam energy and current density, and separation of plasma and substrate conditions. That is, the substrate is located outside the plasma which generates the ions, allowing independent optimization of the etching process and the plasma generation process. Energetic, highly directional ions delivered as a broad, high-density beam at the optimum incidence angle(s) to the substrate can produce highly anisotropic etch profiles. Because of the separation of the wafer from the plasma, IBE process pressures are typically two orders of magnitude below those of parallel-plate RIE systems. These low process pressures ensure lossless transport of ion energies to the substrate for maximum anisotropy and limit redeposition of etched material back onto the wafer.

A "pure" ion beam etching process uses inert gases such as argon as the source of etching ions, which may be considered a purely physical etch process. Advantages of this approach are the ability to etch any material, and to etch multi-component materials without residues due to preferential etching. Because no reactive processes are involved, IBE etch repeatability can be well controlled and performance is not sensitive to variables such as wafer preparation. Correspondingly, the lack of a chemical etch component may also limit the etch rates and selectivities obtained by IBE.

Under certain etch conditions, unacceptable levels of sidewall redeposition (also known as "fences") can occur for IBE. This is especially a concern when etching metals, particularly noble metals and alloys such as permalloy. Similar problems are observed with RIE of these materials because of the need to use a large physical etch component, as mentioned above. In fact, this effect is exacerbated at normal incidence (RIE configuration), whereas in the IBE process an off-normal etch angle can be used (for example, during the "overetch" stage) to remove redeposited material from the sidewall. It has been demonstrated that production devices can be fabricated in high yield with negligible sidewall redeposition by this method. IBE is presently the preferred method used for patterning the permalloy pole tip in the thin-film magnetic head industry.

In the RIBE method, reactive gases are supplied to the ion source instead of, or in combination with, inert gas. This provides a chemical etch component to supplement the physical etch process. RIBE may be viewed as combining the features of RIE and IBE. Compared to RIE, RIBE provides greater control of the chemical versus the physical etch features. Like IBE, it also provides the capability to easily adjust the etch angle to tailor the sidewall profile or adjust the etch selectivity.

As mentioned, until recently, this technique has had limited usefulness in a production environment because of the fact that most Kaufman ion sources use a DC discharge to generate the plasma. H. R. Kaufman, "Broad-beam ion sources: present status and future directions," J. Vac. Sci. Technol. A, Vol. 4, No. 3, p. 764 (1986). Broadbeam DC ion sources use hot filaments or hollow cathodes to generate the needed electrons. Hot filaments and hollow cathodes have extremely short lifetimes in corrosive or reducing gas environments. Operation of a DC discharge source at greater than 50% reactive gas is not usually possible even for short periods, because of instability and immediate cathode degradation. Consequently, the reported RIBE etch selectivities have also been limited. These problems are not encountered with an RF inductively coupled plasma (RF-ICP) ion beam source such as the one described by V. Kanarov, A. Hayes, R. Yevtukhov, B. Vidinsky, and A. Navy, "Thirty five centimeter diameter radio frequency ion-beam source," Rev.

Sci. Instr., Vol. 69, p. 874 (1998). Since there is no filament or cathode in the plasma, the time between maintenance operations is greatly extended compared to a DC discharge ion source, even for inert gas operation.

Nevertheless, species within a RF-ICP which may be useful for etching certain materials by RIBE may result in unintentional deposition (e.g., of carbonaceous material which may include, by way of example, polymer structures) within the ion source. Additionally, species present in an ion beam extracted from such a RF-ICP may result in unintentional deposition (e.g., of carbonaceous material) on the substrate structure being processed by the reactive ion beam. The unintentional deposition within the ion source may result in instability and unreliability in operating the ion source and, therefore, in unreliability in devices processed using the ion source (e.g., including, for instance, increased variance in device characteristics and/or performance, poor device yield, lack of repeatability for independently processed substrates or batches of substrates). The unintentional deposition on the processed structure, although it (e.g., sidewall polymer formation) may facilitate anisotropic etching, may also render the processed device unreliable, and completely removing it without damaging (e.g., pitting or unintentionally etching) the structure may be difficult. Accordingly, the deleterious effects of such unintentional deposition may limit or preclude the use of certain RIBE etching species which are otherwise desirable (e.g., with respect to etch rate and/or etching selectivity) for processing various materials and devices, thus also limiting or precluding the advantages (e.g., etch rate, etch selectivity, etc.) which can be realized from using these species. By way of example regarding how use of otherwise desirable species may be limited, avoiding such deleterious effects may require using a low concentration of the species relative to a chemically inert species and/or may require using additional chemically reactive species that do not provide all the attributes of the otherwise desirable species.

It may be appreciated, therefore, that further advancements and improvements in RIBE processes are needed, particularly for controlling, eliminating, and/or removing unintentional deposition within an ion source and/or on the substrate being processed during RIBE processing. Additionally, improvements in thin film magnetic head fabrication processes are also needed, and particularly for a pole tip trimming process employing anisotropic etching techniques having high selectivity and/or etch control as well as high throughput, yield, reliability, and reproducibility.

SUMMARY OF THE INVENTION

The present invention overcomes the above mentioned problems and other limitations, by providing a reactive ion beam processing method using an ion source that selectively contains a first plasma having a chemically reactive species capable of forming carbonaceous deposits within the ion source and/or on a sample processed by an ion beam extracted from the first plasma, and that selectively contains a second plasma having an oxidizing species or agent to control, mitigate, or remove carbonaceous deposits that may have been formed within the ion source and/or on the sample processed by the first plasma. Such a reactive ion beam processing method thus also provides for a thin film head fabrication process employing an ion beam that includes the chemically reactive species.

In accordance with an aspect of the present invention, during operation of an ion source, after operating the ion source with a plasma having a carbonaceous deposit forming species, a plasma containing an oxidizing agent (species) is generated within the ion source. Preferably, within the ion source a plasma is maintained essentially continuously between the time that the carbonaceous deposit forming species is present and the time that the oxidizing agent is present. For instance, a source gas for the oxidizing species may be introduced into the ion source while the source gas for the carbonaceous deposit forming species is still flowing into the ion source. Then, the carbonaceous deposit forming species' source gas may be discontinued while the oxidizing species' source gas continues to flow. Alternatively, the flow of source gas for the carbonaceous deposit forming species may be discontinued before the oxidizing species' source gas is introduced into the ion source, but a plasma is maintained during the intervening time interval. For example, at any time before the carbonaceous deposit forming species' source gas flow is discontinued, a second source gas (which produces chemically inert or reactive species) may also be introduced into the ion source and its flow into the ion source continued (to sustain a plasma) until the oxidizing species' source gas is introduced into the ion source. The second source gas flow may be discontinued at any time after the oxidizing species' source gas has been introduced into the ion source, including even after the oxidizing species' source gas flow has been discontinued.

In accordance with another aspect of the present invention, a reactive ion beam extracted from an ion source containing a plasma having an oxidizing species may be impinged onto a sample substrate to remove (i.e., etch) any polymer formed on the sample, such as may be formed from previous RIBE processing steps using an ion beam having species which may form carbonaceous deposits on the sample substrate structure. Preferably, a reactive ion beam containing an oxidizing species is incident upon the sample at an angle which enhances the selectivity of the carbonaceous deposit etching relative to other materials upon which the ion beam impinges. That is, differences in the angular dependence of oxidizing ion beam etching for different materials is used to enhance or optimize selectivity for a given process.

In accordance with yet another aspect of the present invention, a thin film magnetic head is fabricated according to a pole trimming process which employs RIBE with an oxidizing species to remove any carbonaceous deposits formed during the pole trimming process which preferably employs an ion beam containing CHF3 based species to selectively etch $Al_2O_3$ relative to permalloy.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE INVENTION

Figure 1:
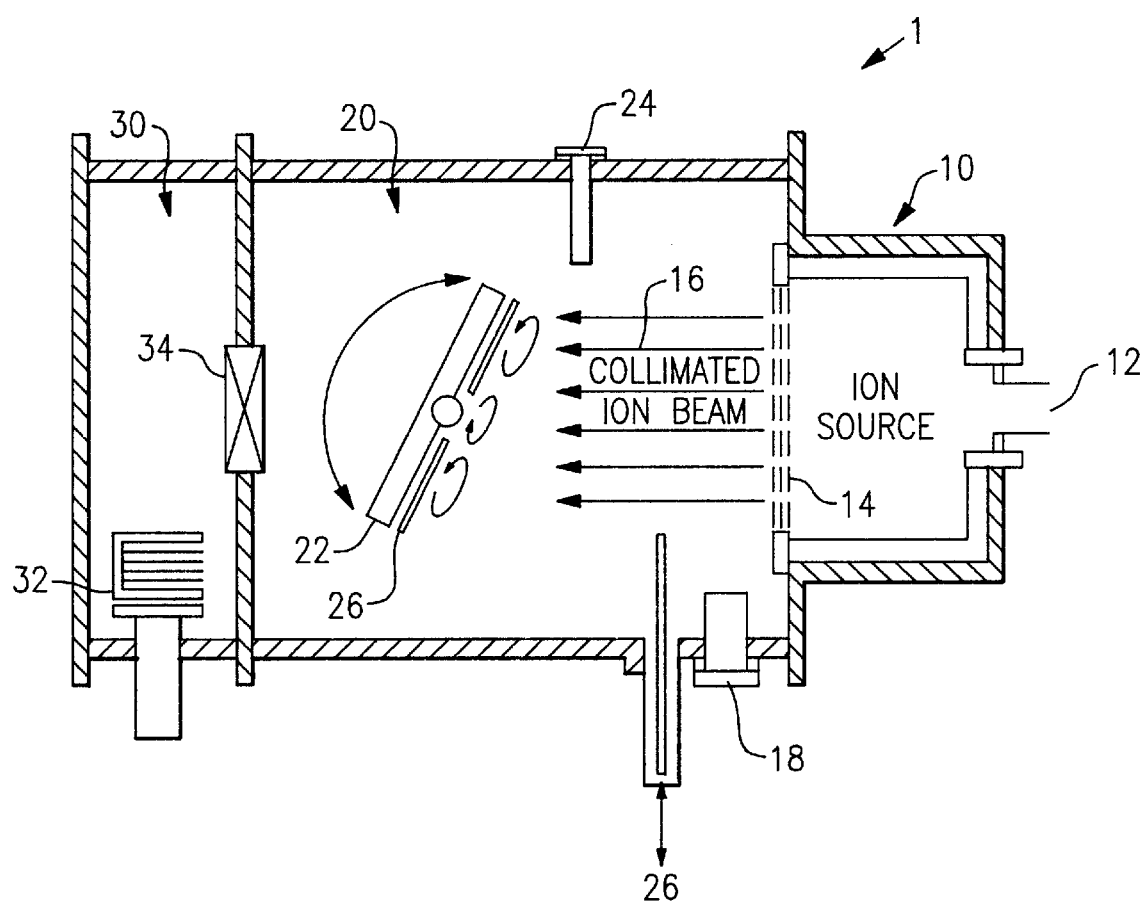
FIG. 1 is a schematic cross-sectional lengthwise view of a radio-frequency inductively coupled plasma ion source system which may be used to implement processes in accordance with the present invention.

Referring to FIG. 1, there is shown a schematic cross-sectional view of an illustrative radio-frequency inductively coupled plasma (RF-ICP) ion source system 1 which may be used for implementing processes in accordance with the present invention. RF-ICP ion source system 1 includes a RF-ICP ion source 10, a low pressure process chamber 20, and a loadlock chamber 30. A plasma may be generated in ion source 10 via inductively coupled RF excitation (RF source and coils not shown) of a process gas (or gas mixture) injected into ion source 10 via process gas inlet 12. A potential (i.e., beam voltage) applied to optically aligned grids 14 extracts a collimated ion beam 16 from the plasma formed within ion source 10. As known in the art, grids 14 may be implemented in various ways, for example, including a (first) "screen" (anode) grid that contacts the plasma and controls its potential, an (second) "accelerator" grid that is typically driven by an adjustable negative high voltage supply (not shown), and a (third) "decelerator" electrode which is typically grounded. A neutralizer 18 located in process chamber 20 is disposed near optically aligned grids 14 and emits an electron flux into collimated ion beam 16 to provide a net neutral charge flux associated with collimated ion beam 16. An illustrative RF-ICP ion source which may be used in accordance with the present invention is described in V. Kanarov, A. Hayes, R. Yevtukhov, B. Vidinsky, and A. Navy, "Thirty five centimeter diameter radio frequency ion-beam source," Rev. Sci. Instr., Vol. 69, p. 874 (1998).

Process chamber 20 includes a substrate holder 22 that is pivotally mounted such that the angle of incidence of collimated ion beam 16 relative to a normal to the substrate surface may be adjusted in situ (i.e., during a process, without breaking vacuum). Substrate holder 22 may be implemented for holding and rotating a single substrate, or for holding and moving two or more substrates in, for example, a planetary motion. Additionally, substrate holder 22 also provides for controlled heating or cooling of the mounted substrates in cooperation with a temperature controller. A pivotally mounted shutter 26 may be selectively interposed between the collimated ion beam 16 and substrate holder 22 to prevent collimated ion beam 16 from impinging onto substrate holder 22 and any substrates mounted thereon. Preferably, process chamber 20 also includes a downstream process gas inlet 24 which permits selective introduction of a process gas directly into process chamber 20 at various desired times before, during, or after IBE or RIBE processing (e.g., to effect non-plasma, non-IBE processing, or to enhance IBE processing).

Loadlock chamber 30 is isolated from process chamber 20 by loadlock gate valve 34 and has a cassette loading mechanism 32 for handling multiple substrates. Additionally, it is understood that the vacuum pumping system (not shown), in conjunction with the gate valve 34 isolation between process and loadlock chambers, permits loading/unloading wafers in loadlock chamber 30 while concurrently processing substrates in process chamber 20. Further, a wafer handling transfer mechanism (not shown) permits transferring wafers between process chamber 20 and loadlock chamber 30.

It is also understood that the illustrative RF-ICP ion source system shown in FIG. 1 may be modified to include additional ion sources (e.g., RF-ICP and/or Kaufman) to provide for concurrent ion bombardment of the substrate(s) by two or more separate ion sources. Each such additional source may be mounted on a port/feedthrough (e.g., using a bellows) that provides an adjustable angle of incidence relative to a given fixed orientation of the substrate surface.

In myriad ion beam etching processes, in an ion source such as that shown in FIG. 1 a plasma formed within the ion source may contain one or more species (e.g., neutrals, radicals, ions) which result in carbonaceous deposit formation within the ion source (e.g., on the grids and/or on the inner walls). Additionally, species extracted from the plasma and incident onto the substrate may also result in carbonaceous deposit formation on portions (e.g., sidewalls) of the structure being etched. The carbonaceous material deposition within the ion source results in unreliability in operating the ion source and, therefore, in unreliability in devices processed using the ion source. The carbonaceous deposit formation on the processed structure, although it may facilitate anisotropic etching, may also render the processed device unreliable, and completely removing it without damaging (e.g., pitting or unintentionally etching) the structure may be difficult. Accordingly, the deleterious effects of such carbonaceous formations may limit (e.g., limit the concentration or use as the only reactive species) or preclude the use of certain RIBE etching species which are otherwise desirable (e.g., with respect to etch rate or etching selectivity).

In accordance with the present invention, during operation of an ion source such as that shown in FIG. 1, after operating the ion source with a plasma having a carbonaceous deposit forming species, a plasma containing an oxidizing agent (species) is generated within the ion source. In a preferred embodiment, within the ion source a plasma is maintained continuously between the time that the carbonaceous deposit forming species is present and the time that the oxidizing agent is present. That is, there is essentially no interruption in the plasma state (although different species may be present) to an extent that thermodynamic equilibrium is reached by all species which comprise the plasma. For instance, a source gas for the oxidizing species may be introduced into the ion source while the source gas for the carbonaceous deposit forming species is still flowing into the ion source. Then, the carbonaceous deposit forming species' source gas may be discontinued while the oxidizing species' source gas continues to flow. Alternatively, the flow of source gas for the carbonaceous deposit forming species may be discontinued before the oxidizing species' source gas is introduced into the ion source, but a plasma is maintained during the intervening time interval. For example, at any time before the carbonaceous deposit forming species' source gas flow is discontinued, a second source gas (which produces chemically inert or reactive species) may also be introduced into the ion source and its flow into the ion source continued (to sustain a plasma) until the oxidizing species' source gas is introduced into the ion source. The second source gas flow may be discontinued at any time after the oxidizing species' source gas has been introduced into the ion source, including even after the oxidizing species' source gas flow has been discontinued.

In accordance with another embodiment of the present invention, a reactive ion beam extracted from the ion source containing the oxidizing species may be impinged onto a sample substrate to remove (i.e., etch) a carbonaceous deposit formed on the sample (e.g., formed from previous RIBE processing). In a preferred embodiment, a reactive ion beam containing an oxidizing species is incident upon the sample at an angle which enhances the selectivity of the carbonaceous deposit etching relative to other materials upon which the ion beam impinges. That is, differences in the angular dependence of oxidizing ion beam etching for different materials is used to enhance or optimize selectivity for a given process.

In each of these embodiments, which may be practiced together to implement various device fabrication processes, the total operating time of the ion source with the plasma containing the oxidizing species may typically be about 1.5 to about 2.5 times the total time that the ion source has been run with precursor gases that produce carbonaceous deposits (i.e., since the last cleaning). More specifically, this total cleaning time includes the sum of the times for consecutive cleaning steps (i.e., substrate and/or ion source) that are performed in the given ion source without intervening steps that introduce carbonaceous deposit forming plasmas into the given ion source. This time range, however, is merely a guideline (based on various experiments performed in developing a TFMH process) for developing a reliable and reproducible process by providing for sufficient carbonaceous deposit cleaning while also minimizing or reducing any deleterious ancillary effects of using an oxidizing precursor gas (e.g., system maintenance, such as pressure gauges, pumps, and plasma bridge neutralizer). Longer or shorter times may be preferable depending on the given overall fabrication process, as well as its various processing parameters (e.g., beam voltages and currents, accelerator voltage, precursor gases, substrate temperature, process chamber gases, etc.).

Additionally, in each of these embodiments, the ratio of Ar to O2 is typically in the range of about 2:1 to about 1:4. This range is an illustrative guideline based on experimental observations which showed that a pure oxygen plasma resulted in nonuniform removal of carbonaceous deposits in the ion source, leading to its delamination and the formation of flakes and macroparticles. On the other hand, to achieve effective cleaning at low oxygen percentages required a length of time not well suited for a typical production process. Maintaining the Ar to O2 precursor gas mixture flow rate within this recommended range, however, showed effective layer by layer removal of precipitates, completely preventing the aforesaid formation of flakes and macroparticles, within a time well suited for production processes.

Such methods of removing carbonaceous deposits from within an ion source and from on a substrate, may be advantageously implemented in myriad processes, such as the following illustrative partial pole trimming process, which is described with reference to FIGS. 2A–2J. It is understood that this process, and the materials used therein are merely illustrative of processes and materials to which the present invention is applicable.

Figure 2A:
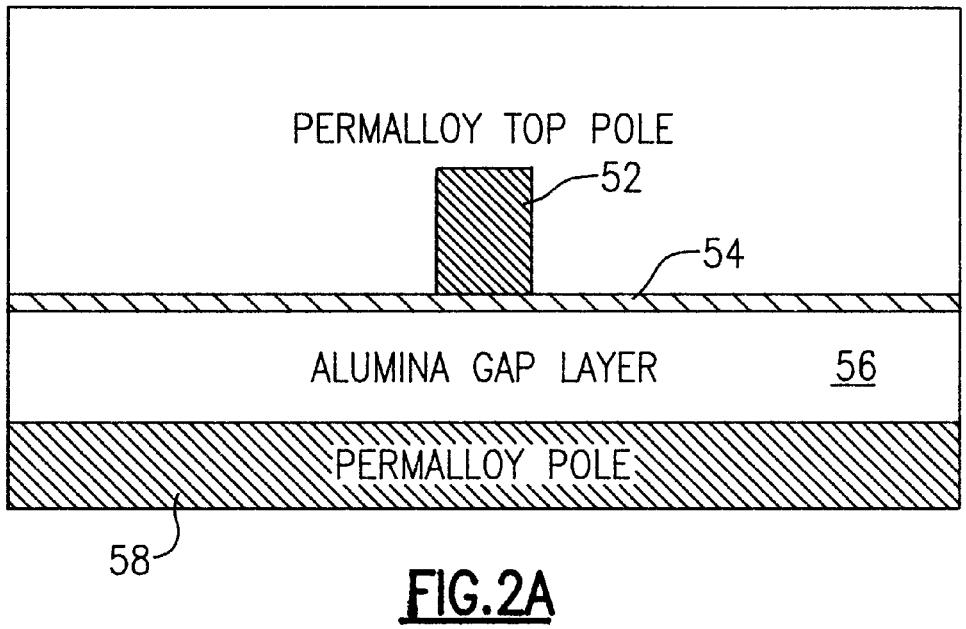
FIG. 2A is schematic vertical cross-section through a pole region of a structure to undergo a partial pole trimming process, in accordance with an embodiment of the present invention.

More specifically, FIG. 2A illustrates a vertical cross-section through the pole portion of a multilayer structure being processed to form a magnetic head device. A lower permalloy (i.e., Ni:Fe) pole layer 58 underlies an alumina (i.e., Al2O3) gap layer 56 which underlies a permalloy seed layer 54. A patterned upper pole layer 52 defined at a desired track width overlies selective portions of permalloy seed layer 54. In this embodiment, the patterned upper pole is formed by patterned, selective electroplating (e.g., photoresist frame plating) onto seed layer. Alternatively, for example, patterned upper pole layer may be formed by blanket vacuum deposition (e.g., sputtering) of permalloy directly onto alumina gap layer, followed by IBE using a patterned photoresist layer as a mask to define the upper pole, followed by photoresist removal (e.g., wet chemical dissolution, plasma ashing, or RIBE). Yet another alternative for defining the upper pole layer is by liftoff of vacuum deposited permalloy. Illustrative nominal thickness for the lower permalloy pole layer, alumina gap layer, permalloy seed layer, and patterned upper pole layer are 3 µm, 0.25 µm, 0.05 µm, and 3 µm, respectively. A goal of the pole trimming process is to etch anisotropically through gap material while minimizing the amount of patterned upper pole layer material removed.

Figure 2B:
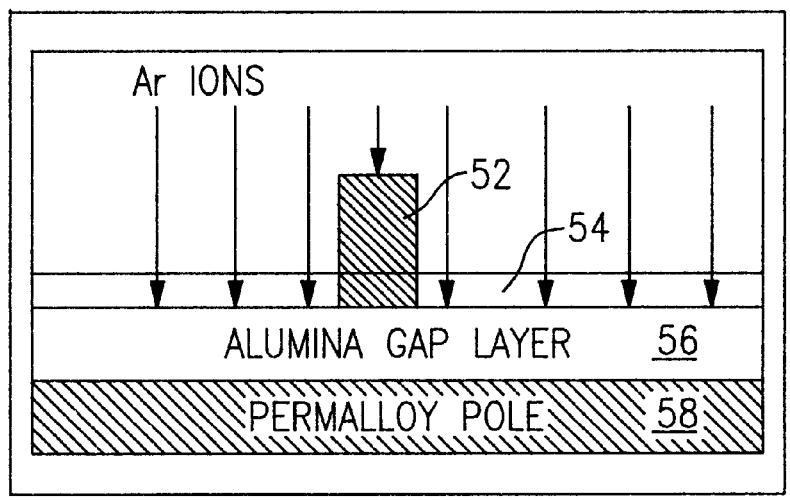
FIGS. 2B–2I, in order, schematically illustrate the structure shown in FIG. 2 undergoing a sequence of ion beam etching and reactive ion beam etching steps of a partial pole trimming process, in accordance with an embodiment of the present invention.

With the structure of FIG. 2A mounted and rotating on the substrate holder 22, an argon (Ar) ion beam extracted from the ion source is impinged onto the structure at a low angle of incidence (e.g., 0 degrees or, more generally, in the range of about 0 degrees to about 45 degrees) to remove seed layer 54 by IBE (FIG. 2B). By way of example, the Ar ion beam energy and current density may be in the ranges of 500–1000 eV and 0.5–1.5 mA/cm$^2$, respectively.

Figure 2C:
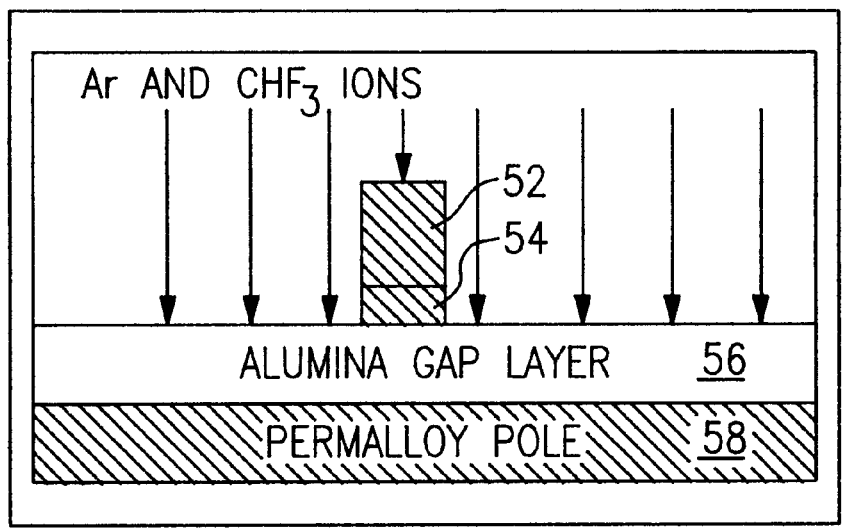
Figure 2D:
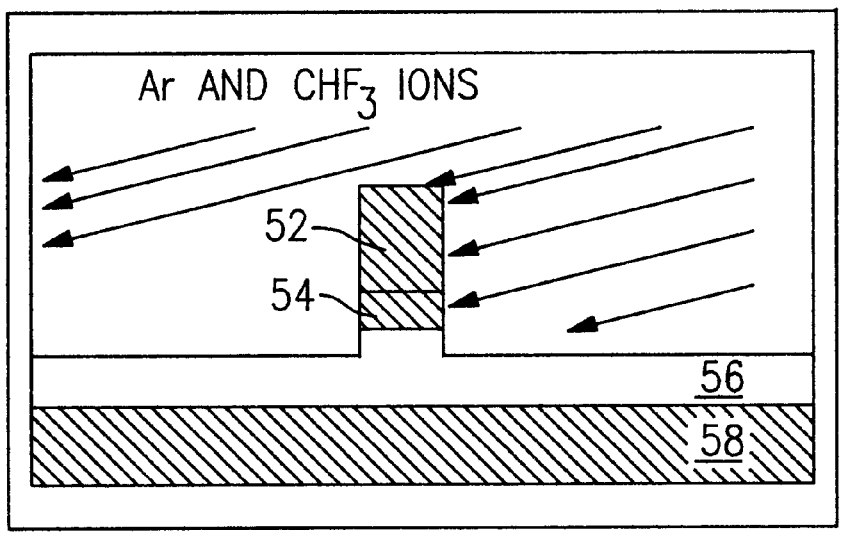
Figure 2E:
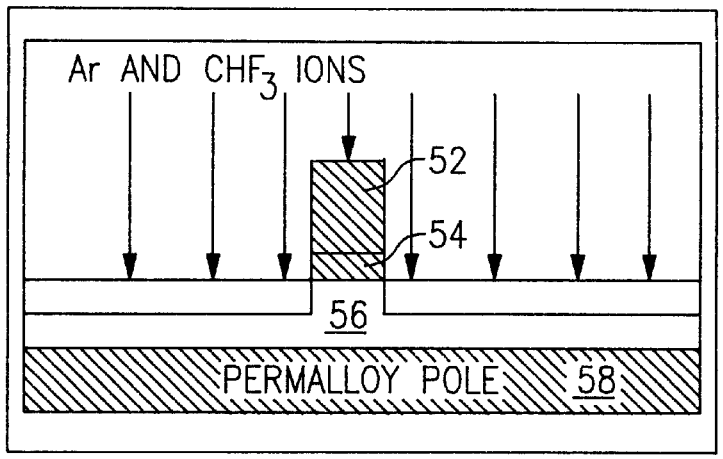
Figure 2F:
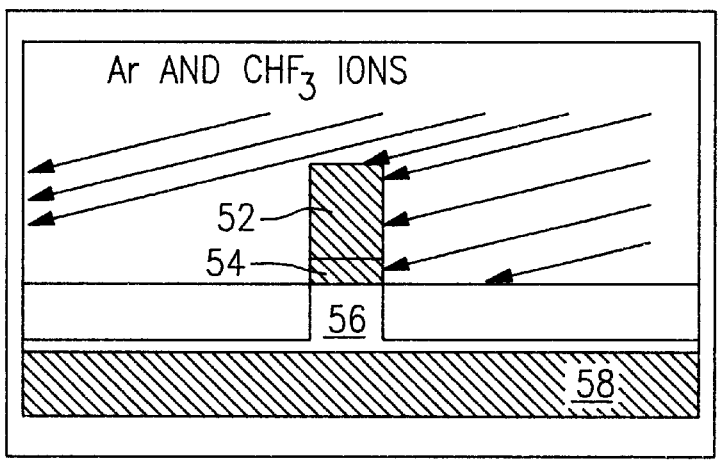

Following removal of seed layer 54, CHF3/Ar RIBE is performed to etch gap layer 56 anisotropically while also removing redeposition from the sidewalls. More particularly, first a CHF3/Ar ion beam is directed at the substrate at a low angle (e.g., 0 degrees–20 degrees or, more generally, in the range of about 0 degrees to about 45 degrees) to preferably etch about 125 nm (i.e., about one-half the total thickness) of alumina gap layer 56 (FIG. 2C). Then, the substrate is shuttered from the CHF3/Ar ion beam, rotated to a high angle of incidence (e.g., 60 degrees–90 degrees), and exposed to the CHF3/Ar ion beam at the high angle of incidence (e.g., 60 degrees–90 degrees) to remove any etching debris redeposited ("redep") onto sidewall structures during the precedent low angle CHF3/Ar etching step (FIG. 2D). Following the redep removal, the substrate is shuttered from the ion beam, rotated again to a low angle of incidence, and exposed to the CHF3/Ar ion beam at the low angle of incidence to etch the remaining thickness of gap layer 56 (FIG. 2E). Then, the substrate is again shuttered from the CHF3/Ar ion beam, rotated again to a high incidence angle, and exposed to the CHF3/Ar ion beam at the high angle to remove any sidewall redep generated during the previous step (FIG. 2F). By way of example, for each of these steps, a 3:1 CHF3:Ar volume ratio flows into the ion source, and the ion beam has a beam energy of 700 eV and a current density of 1.1 mA/cm$^2$.

Figure 2G:
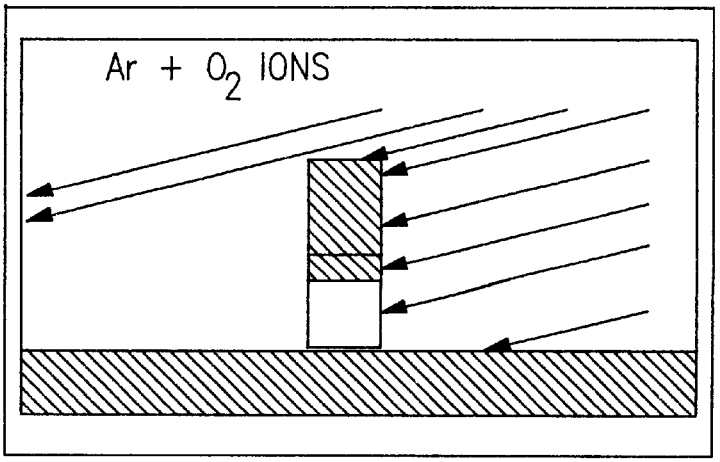
Figure 2H:
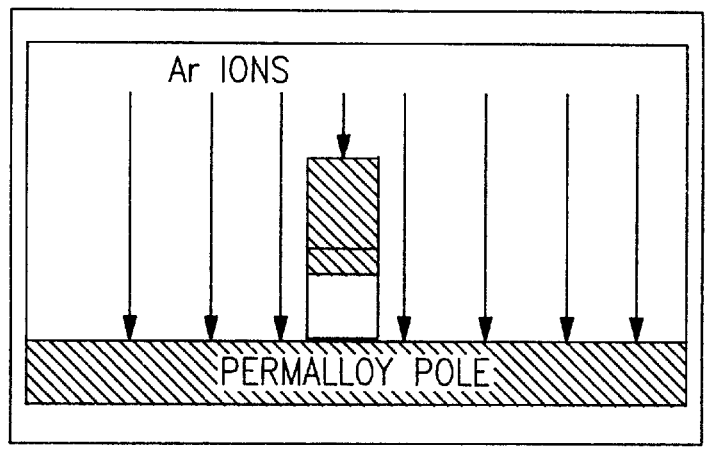

In accordance with an embodiment of the present invention, after substantially etching gap layer 56, RIBE comprising an oxidizing species is performed to clean sidewall redep (including any carbonaceous deposit formation) on the substrate. In particular, upon completing gap layer 56 etching, the substrate is shuttered from the CHF3/Ar ion beam and the CHF3 gas flow into the ion source is replaced by a gas which yields an oxidizing species in the plasma contained in the ion source. In the present embodiment, oxygen ($O_2$) is used as a source gas for the oxidizing species. In converting from a CHF3/Ar source gas mixture to an O2/Ar source gas mixture supplying the plasma, Ar gas continues to flow into the ion source in which a plasma state is sustained. Upon establishing an O2/Ar based plasma within the ion source, an O2/Ar reactive (i.e., oxidizing) ion beam is extracted from the ion source and impinged upon the substrate at a high angle, as shown in FIG. 2G, to remove redep from sidewall structures. It may also be appreciated that this O2/Ar RIBE also removes any thin continuous or discontinuous layer of alumina intentionally or unintentionally (e.g., redeposition) remaining over lower pole 58 (not underlying upper pole 52) after the preceding $Ar/CHF_3$ RIBE step. By way of example, for this step, a 1:1 O2:Ar volume ratio flows into the ion source, and the ion beam has a beam energy of 700 eV and a current density of 1.1 $mA/cm^2$.

In completing the O2/Ar RIBE of the substrate, the shutter is interposed between the ion source and the substrate and\or the potential applied to acceleration grids 14 is adjusted (e.g., grounded) to eliminate ion beam extraction from the ion source. The O2/Ar based plasma, however, is sustained within the ion source for a period of time to remove any remaining carbonaceous deposits within the ion source, in accordance with a further embodiment of the present invention.

Figure 2I:
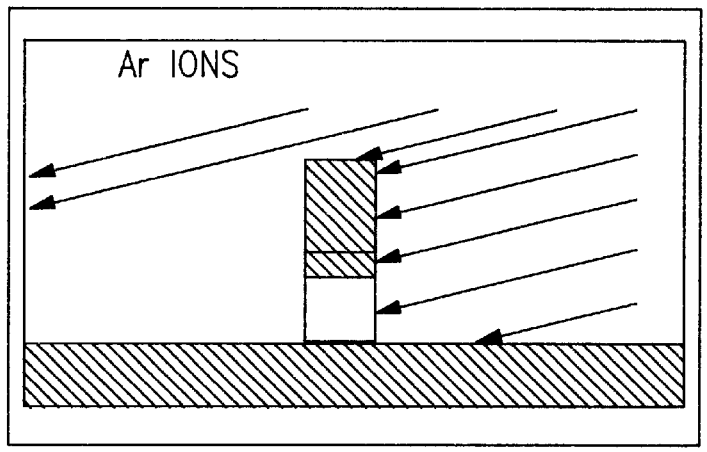
Figure 2J:
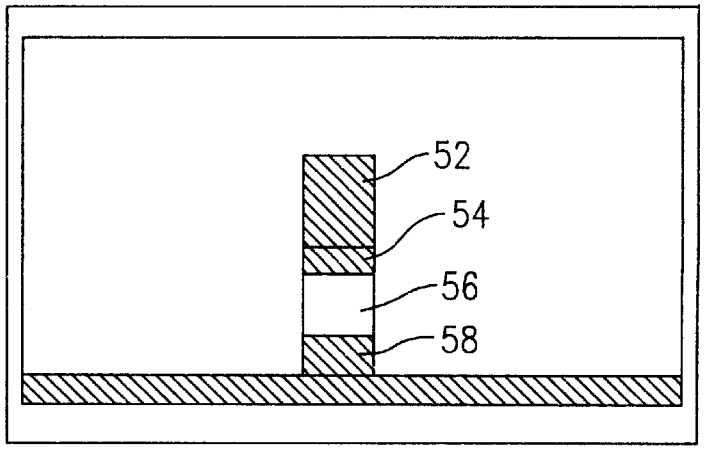
FIG. 2J is schematic vertical cross-section through the pole region of the TFMH structure after completing the partial pole trimming process shown in FIGS. 2B–2I, in accordance with an embodiment of the present invention.

To complete the partial pole trimming process, an Ar IBE is used to remove a portion of lower pole 58. Preferably, the total thickness removed is approximately equal to three times the thickness of gap layer 56, and the total thickness is removed by repeating the following two steps three times: (1) Ar IBE of the substrate at a low angle (e.g., about 0 degrees–about 45 degrees, although the range of about 0–about 30 degrees may be preferable) to etch about one-third the desired total thickness to be removed (FIG. 2H); and (2) Ar IBE of the substrate at a high angle (e.g., 60 degrees to 90 degrees or, more preferably, about 60 degrees to about 80 degrees) to remove any redep from sidewall structures (FIG. 2I). In iteratively executing these two steps, preferably the substrate is shuttered from the ion beam between steps when the angle of incidence is changed. Upon etching the desired total thickness, the shutter is interposed between the ion beam and the substrate, and the ion source may be shut down. FIG. 2J shows a schematic cross section of the TFMH pole structure after completing the partial pole trimming process.

It may be appreciated that the foregoing illustrative process advantageously implements not only the carbonaceous deposit removing attributes of using an oxidizing species within the plasma of an RF-ICP ion source and within a reactive ion beam extracted from an ion source, but also the angular etching selectivity dependence of an ion beam containing an oxidizing species relative to different materials (e.g., permalloy, alumina, and carbonaceous materials such as carbonaceous polymer structures). Additionally, it may be understood that the carbonaceous deposit (e.g., polymer) removing attributes (from within the ion source and/or from the substrate) enables using certain reactive ion beam and plasma species (e.g., CHF3 derived) which may have distinct etching attributes (e.g., etch rate and selectivity for certain materials) but which would otherwise not be practicable for a commercial process because of, for example, carbonaceous deposit (e.g., polymer) formation on the substrate and/or within the ion source.

In developing and implementing the foregoing partial pole trimming process using multi-angle etching with CHF3 or O2 derived reactive ion beams, as well as multi-angle etching with inert Ar ion beams, RIBE and inert ion beam etching of permalloy, aluminum oxide and photoresist were investigated. The following examples of experimental results obtained in developing and implementing a partial pole trimming process in accordance with the hereinabove described embodiment are merely provided by way of example to illustrate features and characteristics of the present invention, which is not to be construed as being limited thereby.

EXAMPLE 1

The angular dependence of the etch rates of aluminum oxide, permalloy, and photoresist for reactive and non-reactive ion beams were measured under a range of processing conditions, the ensuing described results measured for the following nominal conditions: process chamber pressure of $3.5 \times 10^{-4}$ Torr, a beam voltage of 700 eV, a beam current density of 1.1 $mA/cm^2$, a 3:1 CHF3:Ar volume flow ratio with a total flow rate of less than 26 sccm, and a 1:1 O2:Ar volume flow ratio with a total flow rate of less than 28 sccm.

Figure 3:
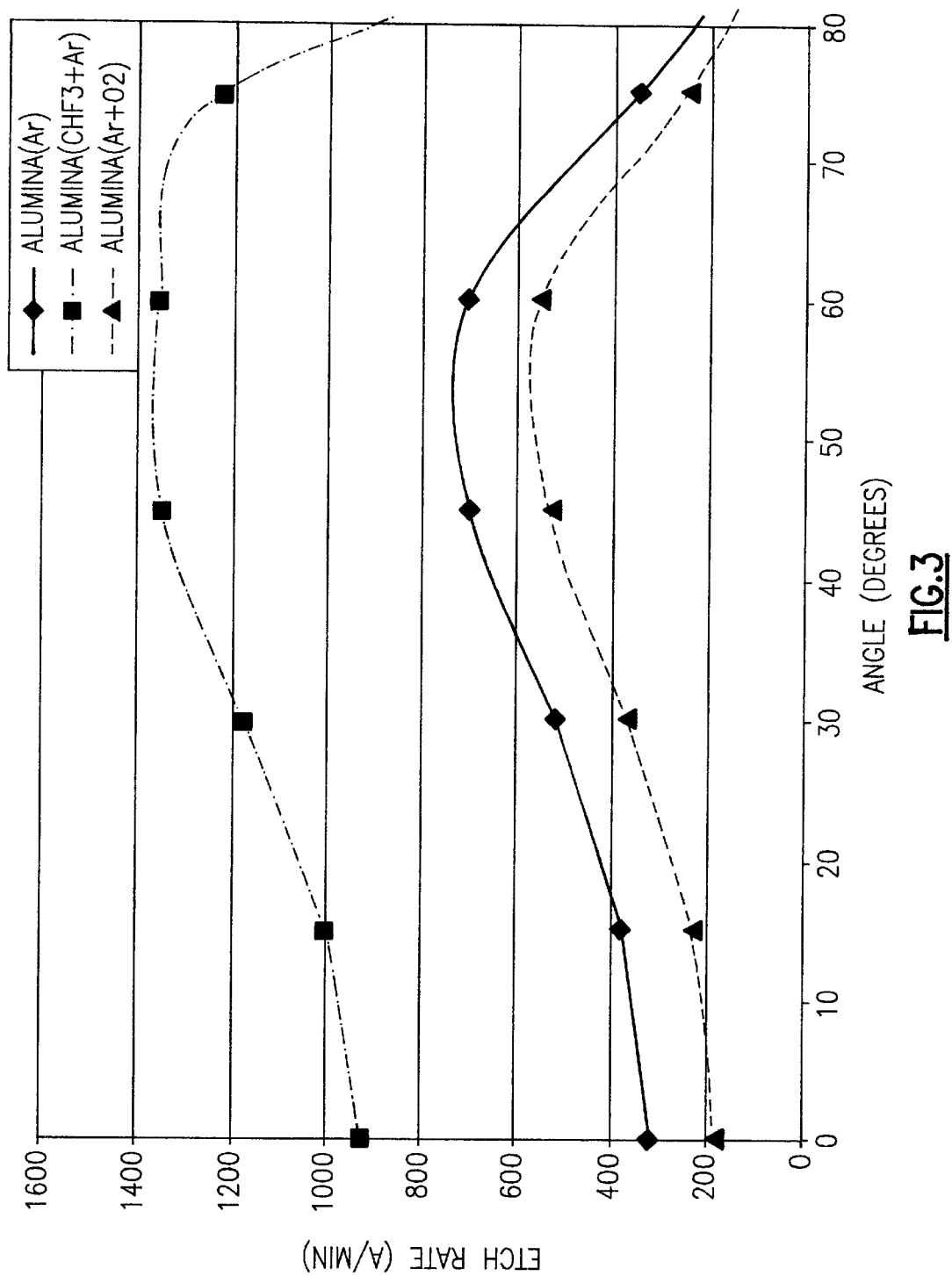
FIG. 3 shows measured etch rates for alumina as a function of incidence angle using various gas mixtures, in accordance with the present invention.
Figure 4:
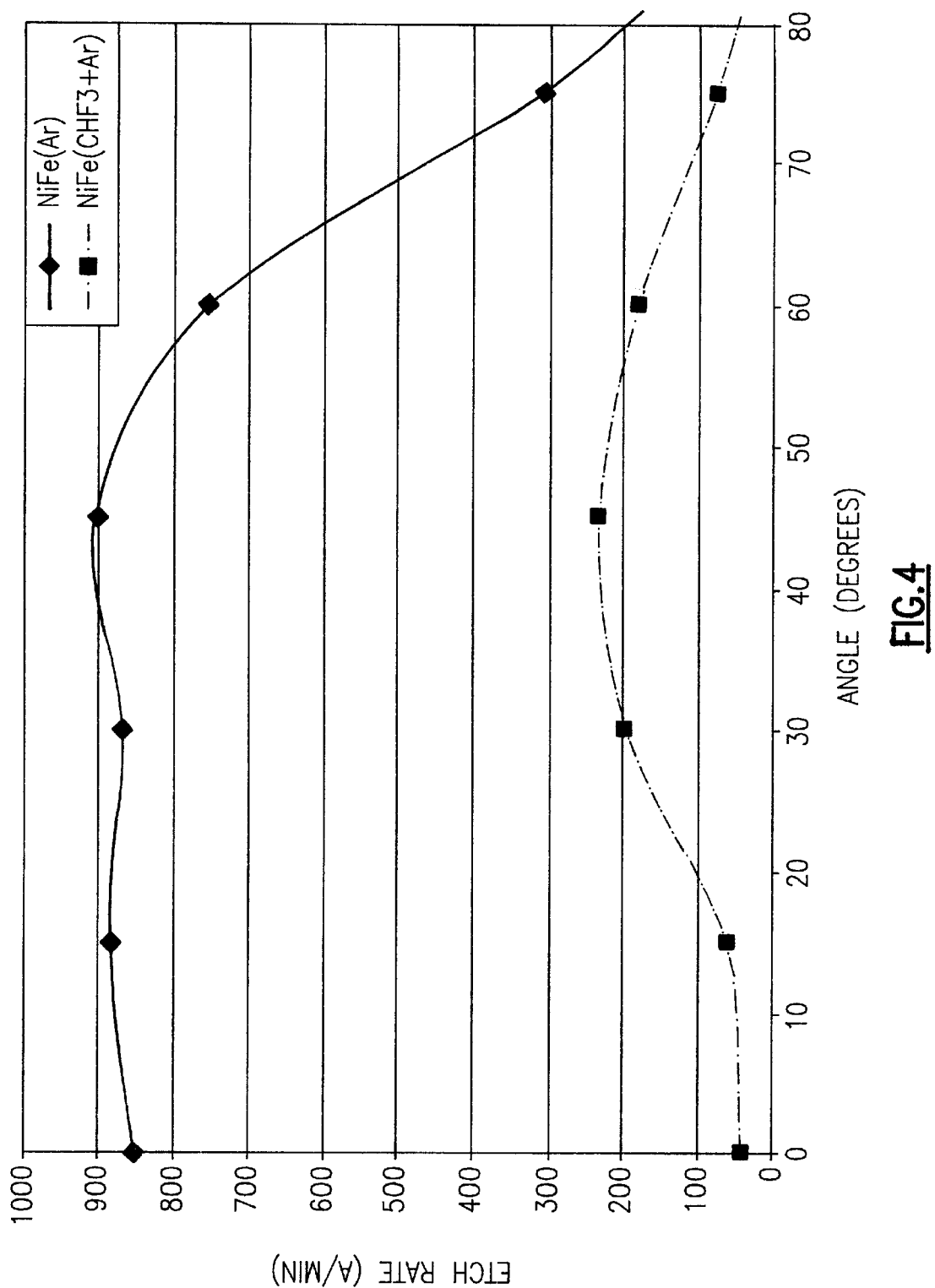
FIG. 4 shows measured etch rates for permalloy as a function of incidence angle using various gas mixtures, in accordance with the present invention.
Figure 5:
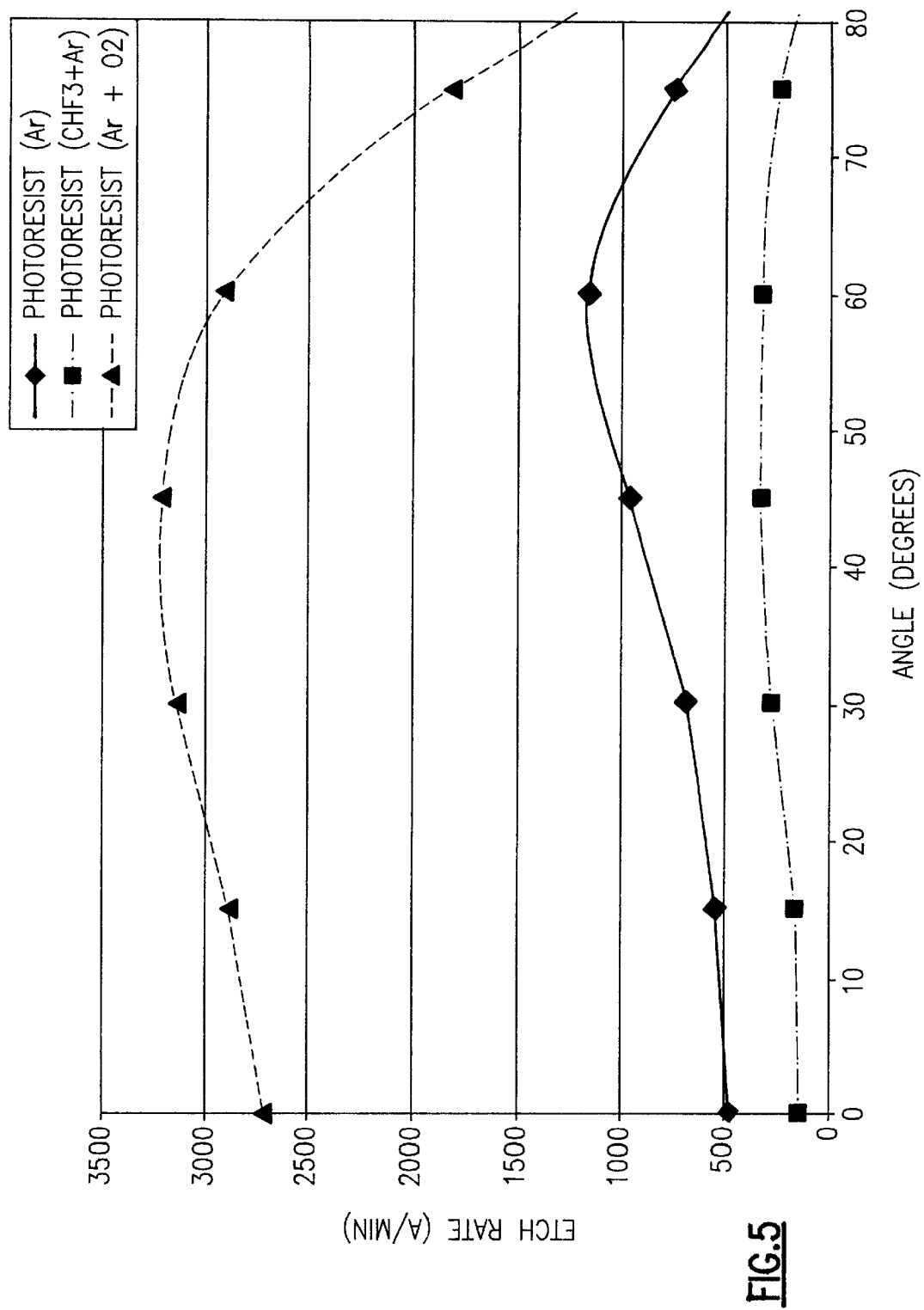
FIG. 5 shows measured etch rates for photoresist as a function of incidence angle using various gas mixtures, in accordance with the present invention.

The measured angular dependence of the etch rates of aluminum oxide, permalloy, and photoresist for reactive and non-reactive ion beams are shown in FIGS. 3–5, and the following table lists the results for RIBE etching of these materials using the CHF3/Ar gas source mixture.

TABLE 1

| Incidence Angle | Etch Rates (Angstrom/Minute) | | |
|---|---|---|---|
| (degrees) | NiFe | Alumina | Photoresist |
| 0 | 38 | 927 | 149 |
| 15 | 59 | 1005 | 168 |
| 30 | 196 | 1180 | 279 |
| 45 | 233 | 1350 | 335 |
| 60 | 181 | 1237 | 329 |
| 75 | 77 | 1229 | 244 |
| 90 | 0 | 0 | 0 |

Figure 6:
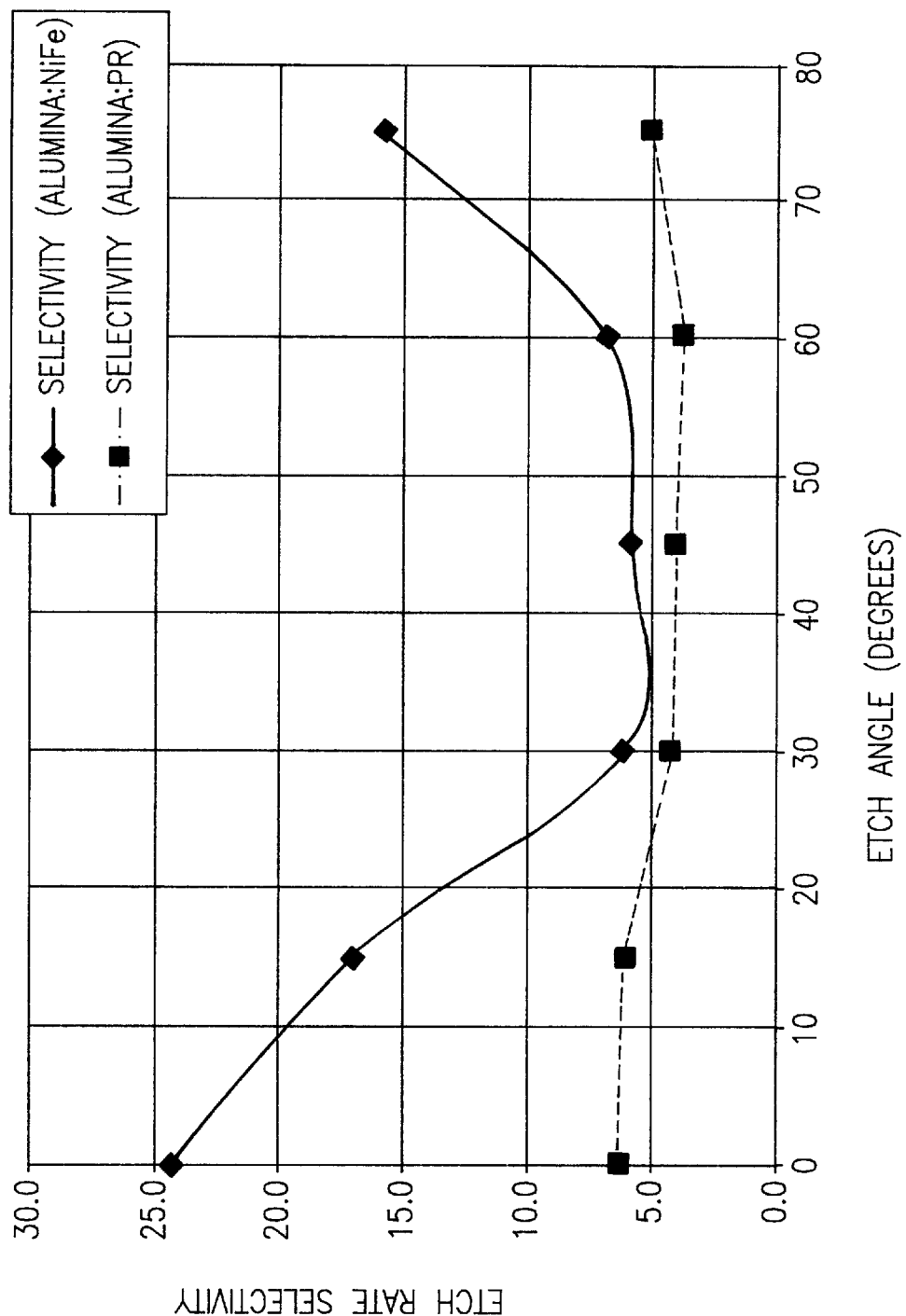
FIG. 6 shows selectivities as a function of incidence angle for alumina:permalloy and for alumina:photoresist as calculated according to the measurement results depicted in FIGS. 3–5 for the CHF3/Ar gas mixture, in accordance with the present invention.

As can be seen in FIG. 3, the aluminum oxide etch rate increases by a factor of 2–3 when using the $CHF_3/Ar$ chemistry compared to using inert Ar IBE only. The rate for permalloy, on the other hand, exhibits a sharp decrease attributable to the formation of carbonaceous (e.g., polymer) deposits on the surface during the etch process (FIG. 4). FIG. 5 shows that the etch rate for photoresist also decreases with the $CHF_3/Ar$ RIBE process compared to the inert Ar IBE process. Compared to using an inert Ar IBE process, these results for the CHF3/Ar based reactive ion beam represent not only an increased etching selectivity for alumina relative to permalloy, but also an increased etching selectivity for alumina relative to photoresist, which is not an expected result. FIG. 6 illustrates the calculated angular dependence of the selectivity for alumina to permalloy and alumina-to-photoresist for the CHF3/Ar based RIBE, as also summarized by the following table:

TABLE 2

| Incidence Angle (degrees) | Selectivity (Alumina:NiFe) | Selectivity (Alumina:PR) |
| --- | --- | --- |
| 0 | 24.4 | 6.2 |
| 15 | 17.0 | 6.0 |
| 30 | 6.0 | 4.2 |
| 45 | 5.8 | 4.0 |
| 60 | 6.8 | 3.8 |
| 75 | 16.0 | 5.0 |

As can be seen, angles near normal incidence and at glancing incidence provide superior selectivity. Notably, at normal incidence the aluminum oxide-permalloy selectivity for the $CHF_3/Ar$ chemistry is over 20:1, compared to about 0.4:1 for pure Ar IBE, which corresponds to a greater than forty-fold etch selectivity enhancement.

The $O_2/Ar$ RIBE etching data depicted in FIGS. 3 and 5 indicate that polymer material can be etched with selectivities (relative to alumina) on the order of 10:1, which is a significant enhancement compared to using a chemically inert Ar IBE, and is an important feature for carbonaceous deposit (e.g., polymer) clean up.

EXAMPLE 2

The information derived from these results was used to develop and implement a multi-angle RIBE TFMH fabrication process in accordance with the embodiment described hereinabove in FIGS. 2A–2J. The initial structure, formed on a TiC and alumina substrate, had a 400 nm alumina gap layer, a 100 nm permalloy seed layer, and an overlying permalloy upper pole layer patterned at a desired track width by selective electroplating. The following table summarizes the sequence of processing steps used, as well as typical processing parameters which were used in each step of the gap layer and partial pole trimming process.

TABLE 3

| Processing Step | Incidence Angle (degrees) | Process Time (min:sec) | Gas Mixture (flow rates in sccm) |
| --- | --- | --- | --- |
| Seed Layer Etch | 5 | 1:50 | Ar (18) |
| Gap Layer Etch | 0 | 4:20 | Ar/CHF3 (7:21) |
| Gap Layer Etch/Sidewall Cleanup | 70 | 1:15 | Ar/CHF3 (7:21) |
| Substrate Cleanup | 70 | 2:00 | Ar/O2 (13:13) |
| Ion Source Cleanup | 90 | 3:00 | Ar/O2 (13:13) |
| Lower Pole Etch | 0 | 3:00 | Ar (18) |
| Sidewall Cleanup | 70 | 2:00 | Ar (18) |
| Lower Pole Etch | 0 | 3:00 | Ar (18) |
| Sidewall Cleanup | 70 | 2:00 | Ar (18) |
| Lower Pole Etch | 0 | 3:00 | Ar (18) |
| Sidewall Cleanup | 70 | 2:00 | Ar (18) |
| Lower Pole Etch | 0 | 3:00 | Ar (18) |
| Sidewall Cleanup | 70 | 2:00 | Ar (18) |

For each IBE or RIBE step, the nominal beam voltage was about 700 V, the nominal beam current was about 1100 mA/cm2, the grid acceleration voltage was about −400V, and the K factor was about 0.6. During ion source cleanup, the grids were grounded. In the processing chamber, a base pressure of about $10^{-7}$ Torr was established and the process pressure varied according to step, depending generally on, for example, the process gas mixture components, the flow rates, and the products of the etching process. RF power necessary to sustain the plasma varied depending on the process step and was typically in the range of about 800 to 1000 watts.

In this partial pole trimming process, only one low angle and one high angle Ar/CBF3 RIBE was used during etching of the alumina gap layer, and four iterations of low angle Ar IBE and high angle Ar IBE were used to partially etch the lower pole to a depth of about 1 μm. Consistent with the above-described results obtained during characterization of the etching processes, during the alumina gap etch a selectivity of greater than 20:1 relative to the upper permalloy pole was observed. Scanning electron microscopy showed nearly vertical sidewalls and no indication of sidewall fencing or redep (which was observed on samples that were not processed with an ion beam having an oxidizing species), confirming the efficacy of the highly selective O2 based RIBE process in removing carbonaceous deposits (e.g., polymers) formed during the process. Multi-angle Ar IBE used for etching the lower permalloy pole also achieved a near vertical sidewall and virtually no redeposition, and the processing parameters yielded a high etch rate (i.e., about 90 nm/min). This process demonstrated production-quality spatial uniformity (i.e., etch rate) and reproducibility (e.g., with respect to measured etch rates over independent runs at the same nominal RIBE processing parameters).

EXAMPLE 3

A wafer for TFMH gap layer and partial pole trimming similar to that of example 2 was transferred into the ion beam system, clamped, and cooled using, e.g. backside gas. It was initially protected from the plasma and ions by a physical shutter. An argon plasma was first generated and a beam was extracted for about 2 minutes at stage tilt angle of −10 degrees (where 0°=ion beam normal to substrate and substrate is vertical, negative angle obtained when the substrate is tilted toward the ground) to remove the seed layer under the following conditions: argon flow about 18 sccm, RF power input about 800 watts, 700 volts on the first grid and −400 volts on the second grid. To remove the alumina gap layer (e.g. 300 nm alumina) a mix of argon and CHF3 was introduced into the ion source to increase the etch rate of the alumina while decreasing the etch rate of the permalloy. The argon to CHF3 gas mix was set to 1:3 and the operating conditions were as follows: argon flow about 7 sccm, CHF3 flow about 21 sccm, RF power input about 1000 watts, 700 volts on the first grid and −400 on the second grid. After providing the plasma in the source and generating the ion beam from the plasma the actual substrate processing lasted for about 3 minutes at 0° and about 1 minute at −70°. Once this process was finished, a cleaning procedure was initiated to remove precipitates formed on the first grid. After the shutter was closed and the wafer brought to the loading position, the gas mix was changed to argon and oxygen to remove precipitates in the source with no ion beam extraction, the parameters for which were: grids at 0 voltage, argon flow of about 13 sccm, oxygen flow of about 13 sccm, and RF power input about 1000 watts for about 8 minutes. The final step performed was a series of argon etches that removed about 0.5 microns of bottom pole material, and which was performed using 18 sccm of argon at multiple substrate tilt angles (0° for about 50–66% of the total etch time and at −700 for about 33–50% of the total etch time) with 700 volts on the first grid and −400 volts on the second. This step lasted from about 15 to 20 minutes.

Use of this process yielded an etch selectivity of about 20:1 (alumina:permalloy), an average alumina reactive ion beam etch rate of about 100 nm/min, and an etch rate spatial nonuniformity over a 8.5" diagonal of less than 3.0%. Among over 200 independent runs, the nonuniformity and rate reproducibility were each less than 3.5%. More particularly, for the parameter of interest (e.g., etch rate, total thickness etched), nonuniformity and reproducibility each represents the following: (H−L)/(H+L), where H=highest value and L=lowest value.

EXAMPLE 4

This example is similar to the previous except for the cleaning procedure, so to avoid repetition only the cleaning procedure will be described in detail. After completion of the alumina gap removal, the wafer was brought to −70 degrees fixture tilt angle, and the gas mix was changed to argon and oxygen to remove precipitates in the source on the first and second grids. The parameters were: argon flow about 13 sccm, oxygen flow about 13 sccm, RF power input about 800 watts, 700 volts on the first grid and −400 volts on the second grid for about 2 minutes. This was followed by shutter closure and putting the voltages on both the first and second grids to zero, and cleaning the remaining polymer precipitate off the first grid and the source walls (i.e., the interior of a quartz bowl in the RIBE system used). The remaining process parameters were: argon flow about 13 sccm, oxygen flow about 13 sccm, and RF power input about 1000 watts for about 8 minutes.

This process resulted in a selectivity of about 20:1 (alumina:permalloy), an alumina reactive ion beam etch rate of about 100 nm/min, a spatial nonuniformity over an 8.5" diagonal of less than 3.0%, and a spatial nonuniformity and etch rate reproducibility each less than 3.5% over 250 runs.

As mentioned, the above-described embodiments and examples are merely illustrative of the present invention, which is not limited thereto. For instance, in accordance with the present invention, it is understood that other source (precursor) gas mixtures may be used to provide species having advantageous etching properties (but capable of yielding carbonaceous (e.g., polymer) deposits), other precursor gases (e.g., $N_2O$, $NO_2$, and $O_3$) may be used to provide oxidizing species for removing carbonaceous deposits from within the ion source and/or from the sample, and other materials (e.g., magnetic and non-magnetic materials, including insulators, conductors, semiconductors) may be processed by such RIBE ion beams (e.g., based on precursor gases that yield carbonaceous-deposit-forming species or oxidizing species in the plasma and/or ion beam) for providing a device fabrication process that advantageously uses carbon containing source gases that otherwise may be excluded as a useable source gas.

By way of example, other precursor gases that can yield useful etching characteristics but may result in carbonaceous deposits include other fluorocarbon precursor gases such as $CF_4$, $C_2F_6$, CH2F2, CH3F, $C_3F_8$, as well as other halocarbons or hydrocarbons. (Note that as used herein, a fluorocarbon is not limited to gases containing carbon and fluorine, exclusively, but may include other elements (e.g., hydrogen) as well. As used herein, the same applies, *mutatis mutandi*, to the use of the terms halocarbons and hydrocarbons. Thus, for example, CHF3 is a fluorocarbon, halocarbon, and hydrocarbon, as well as, more specifically, a fluorohydrocarbon.) Such precursor gases may be used individually as the sole precursor gas that yields chemically reactive species (e.g., mixed with an inert precursor gas) or may be used in combination with each other and/or in combination with other gases which may react with them and/or the substrate. For instance, a mixture of CF4 and CHF3 (and Ar) may be used to practice the invention. Also, for example, a fluorocarbon and noncarbon-containing hydrogen-containing (e.g., H2, NH3) precursor gas mixture (e.g., a mixture of CF4 and $H_2$) or a hydrocarbon and noncarbon-containing fluorine-containing (e.g., F2, HF) precursor gas mixture (e.g., a mixture of CH4 and F2) may be used and, as understood by those skilled in the art, such mixtures can also yield chemically reactive species similar to those provided by using CHF3 as the only chemically reactive precursor gas.

By way of example, illustrative magnetic materials that may be implemented in a device processed in accordance with the present invention and, particularly, that have also demonstrated low or negligible etching rates for such fluorocarbon based ion beams (e.g., relative to the etch rate for alumina) include NiFe (81:19, i.e., permalloy), NiFe (50:50), FeN, FeZN, FeTaN, and CZT (i.e., CoZrTiO3, cobalt zirconium titanate). Additionally, it is noted that device elements (e.g., poles) formed from the magnetic materials need not be compositionally homogeneous single layers: multilayer poles including these materials in one or more layers, or composite materials incorporating one or more of these materials, may be implemented. Illustrative alternative insulating layers that may be implemented in a device processed in accordance with the present invention and, particularly, that have also demonstrated CHF3 based RIBE etching characteristics (e.g., etch rate, selectivity relative to magnetic materials) well suited for device microfabrication include $SiO_2$, $Si_3N_4$, AlN, LiNO3, and ferroelectrics (e.g., barrium strontium titanate, BST ($Ba_xSr_{1-x}TiO3$), lead zirconium titanate, PZT ($PB_xZr_{1-x}TiO3$), lead lanthanum zirconium titanate, PLZT, etc.).

In fact, in studying RIBE of such other insulating materials it was found that RIBE based on various fluorocarbon precursor gases (including mixtures), gave excellent selectivity over most metals (i.e., magnetic and nonmagnetic, such as Mn, Fe, Co, Ni, Cr, Ti, W, Ta, Pt and other refractory metals), several semiconductors (e.g., GaAs, GaN, AlGaAs, crystalline Si, amorphous Si), as well as various polymers, photoresists, polyimides, and carbon allotropes (e.g., diamond-like, amorphous/glassy). For example, a selectivity of 30:1 was demonstrated for SiO2 relative to amorphous Si in a structure processed by a 500 eV, 0.85 mA/cm2 CHF3 based RIBE at normal incidence. Evidently, such selectivity for this system is useful, for example, for fabricating self-aligned microelectronic devices (e.g., thin film transistors).

Similarly, it is understood that the above described etching characteristics (e.g., selectivity, etching profile) are merely illustrative, and that etching characteristics for a given material and/or structure may depend on many parameters, such as source gas mixture composition, source gas flow rate, beam energy, beam current, and angle of incidence. By way of example, it was observed that under essentially the same etching conditions as described above, but using a 300 eV beam energy and a 0.5 mA/cm² beam current density, the CHF3/Ar etching provided infinite selectivity of Al2O3 etching to NiFe (i.e., there was no discernible NiFe etched during etching of the Al2O3 layer). Such a result is an example of using lower beam energy to reduce the rate of physical etching (i.e., sputtering) of the NiFe, which is not chemically etched by the CHF3/Ar ion beam that etches (e.g., chemically and/or physically) the Al2O3 even at the lower beam energy. Although in this example the Al2O3 etch rate decreased and a longer Ar/O2 etching process was required to ensure carbonaceous deposit (e.g., polymer) removal, thus increasing processing time (i.e., decreasing throughput) for the partial pole structure, such infinite selectivity may be desired, advantageous, and/or necessary for processing certain device structures (e.g., a pole structure where very thin NiFe layers and/or Al2O3 layers are used).

In general, as device geometries shrink and new materials are required which are less suited to RIE, the unique flexibility of RIBE to combine high etch selectivities with the power of physical ion beam etching becomes an increasingly important tool for microfabrication technology, and the present invention facilitates the wide application of RIBE by extending the possible etch chemistries of RIBE while also improving its reliability.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

We claim:

1. A process for fabricating a thin film magnetic head, comprising the steps of:
   forming a structure comprising a lower magnetic pole layer, a gap layer overlying the lower magnetic pole layer, and an patterned upper magnetic pole layer over the gap layer;
   bombarding said structure with a first ion beam extracted from a first ion source, the first ion beam operative in etching the gap layer and including a species that is capable of forming a carbonaceous deposit on at least a portion of said structure; and
   bombarding said structure with a second ion beam that includes an oxidizing species to substantially remove the carbonaceous deposit that may have been formed from the first ion beam being directed at said structure.

2. The process according to claim 1, wherein said patterned upper magnetic pole layer acts as a mask during etching of said gap layer by said first ion beam.

3. The process according to claim 1, wherein a patterned photoresist layer overlying said patterned upper magnetic pole layer acts as a mask during etching of said gap layer by said first ion beam.

4. The process according to claim 1, further comprising the step of, prior to etching the gap layer with said first ion beam, etching a seed layer overlying said gap layer and underlying said upper patterned magnetic layer.

5. The process according to claim 1, wherein said step of etching the gap layer with said first ion beam etches a fraction of the initial thickness of said gap layer, and further comprising the step, after said step of bombarding said structure with the second ion beam, of repeating said steps of etching the gap layer followed by bombarding said structure with the second ion beam at least until the entire thickness of the gap layer is etched.

6. The process according to claim 1, wherein said step of etching the gap layer with said first ion beam etches the entire thickness of said gap layer before bombarding said structure with the second ion beam.

7. The process according to claim 1, further comprising the step of, after etching substantially the entire thickness of the gap layer to provide a patterned gap layer, bombarding said structure with an inert ion beam to etch a portion of said lower magnetic pole layer.

8. The process according to claim 7, wherein said step of etching the lower magnetic pole layer with an inert ion beam is performed to etch a desired total thickness of said lower magnetic pole layer by repeating the steps of (a) bombarding said structure with a first inert ion beam directed at a low angle of incidence to the structure to etch a fraction of a desired total thickness of said lower magnetic pole layer, and (b) bombarding said structure with a second inert ion beam directed at a high angle of incidence to the structure to remove redeposition from sidewall structures.

9. The process according to claim 8, wherein said first inert and second inert ion beams are generated using a single ion source.

10. The process according to claim 8, wherein said first inert and second inert ion beams are generated with separate ion sources.

11. The process according to claim 10, wherein said first inert and second inert ion beams impinge on said structure during an overlapping time period.

12. The process according to claim 1, wherein said second ion beam is generated using said first ion source.

13. The process according to claim 12, wherein the first ion beam is generated using a first plasma produced using a fluorocarbon precursor gas, and said second ion beam is generated using a second plasma produced by introducing an oxidizing gas into the first plasma while the fluorocarbon precursor gas is eliminated.

14. The process according to claim 13, wherein the first plasma is produced using the fluorocarbon precursor gas mixed with an inert precursor gas.

15. The process according to claim 13, wherein the first plasma is produced using the fluorocarbon precursor gas exclusive of other precursor gases.

16. The process according to claim 12, wherein the first ion beam is generated using a first plasma produced using a fluorocarbon precursor gas mixed with an an inert precursor gas, and said second ion beam is generated using a second plasma produced by introducing an oxidizing gas into an extant plasma that comprises species derived from the inert precursor gas and is substantially devoid of species derived from the fluorohydrocarbon precursor gas.

17. The method according to claim 16, further comprising the step of maintaining a plasma having oxidizing species derived from the oxidizing gas within the first ion source after the second ion beam etching step is terminated.

18. The process according to claim 1, wherein said second ion beam is generated using a second ion source that is independent of the first ion source.

19. The process according to claim 18, wherein said first and second ion beams impinge on said structure during an overlapping time period.

20. The method according to claim 18, further comprising the step of generating a plasma from an oxidizing precursor gas within the first ion source after terminating said first ion beam.

21. The process according to claim 1, wherein said first ion beam is directed at a first angle of incidence relative to a normal to the structure surface, and wherein said second ion beam is directed at a second angle of incidence relative to the sample normal, said second angle of incidence not equal to said first angle of incidence.

22. The method according to claim 21, wherein said first angle of incidence is less than about 45 degrees relative to the sample normal, and wherein said second angle of incidence is greater than about 60 degrees relative to the sample normal.

23. The method according to claim 1, wherein said first ion beam is directed at a first angle of incidence relative to a normal to the structure surface, said first angle selected to enhance the selectivity of etching the gap layer relative to the patterned upper magnetic pole layer.

24. The method according to claim 1, wherein said second ion beam is directed at a second angle of incidence relative to the sample normal, said second angle selected to enhance the selectivity of removing the carbonaceous deposits relative to etching the gap layer.

25. The process according to claim 1, wherein said upper and lower magnetic pole layers each comprise permalloy and said gap layer comprises alumina.

26. The process according to claim 25, wherein the first ion beam is generated using a fluorocarbon.

27. The process according to claim 26, wherein the rate said first ion beam in etching the alumina is at least about fifteen times greater than the rate of etching the permalloy.

28. The process according to claim 27, wherein the fluorocarbon is CHF3.

29. The process according to claim 28, wherein the rate of etching the permalloy is negligible compared to the rate of etching the alumina.

30. The process according to claim 29, wherein said first ion beam has a beam energy selected to provide negligible physical etching of said patterned upper magnetic pole layer relative to etching of said gap layer.

31. The process according to claim 30, wherein said first ion beam has a beam energy of about 300 electron volts.

32. The process according to claim 1, wherein the second ion beam is generated from a plasma produced from a mixture of precursor gases including an inert gas and a gas containing oxygen.

33. The process according to claim 32, wherein said inert gas and said gas containing oxygen have a mass flow rate ratio of inert gas to oxygen in the range of about 1:4 to about 2:1.

34. The process according to claim 1, wherein said second ion beam is extracted from a plasma produced from at least one precursor gas including at least one gas selected from the group consisting of O2, N2O, NO2, and O3, and mixtures thereof.

35. The process according to claim 1, wherein said first ion beam is extracted from a plasma produced from at least one precursor gas including at least one gas selected from the group consisting of CF4, CHF3, CH2F2, CH3F, C2F6, C3F8, and mixtures thereof.

36. An ion beam etching method, comprising the steps of:
  bombarding a sample with a first ion beam extracted from an ion source that has a first plasma comprising a carbonaceous deposit forming species; and
  introducing, after said first ion beam etching step has been initiated, an oxygen containing gas into an extant plasma of the ion source to provide a third plasma in said ion source, said third plasma having oxidizing species derived from said oxygen containing gas, and wherein said ion source contains a plasma continuously in time between said first plasma and said extant plasma.

37. The method according to claim 36, wherein said carbonaceous deposit forming species is derived from at least one fluorocarbon precursor gas used to form said first plasma.

38. The method according to claim 37, wherein said at least one fluorocarbon precursor gas includes at least one gas selected from the group consisting of CF4, CHF3, CH2F2, CH3F, C2F6, C3F8, and mixtures thereof.

39. The method according to claim 36, wherein said extant plasma is said first plasma.

40. The method according to claim 39, wherein during said introducing step, said carbonaceous deposit forming species is eliminated from the extant plasma.

41. The method according to claim 36, wherein said first plasma includes an inert gas species, and further comprising the step of eliminating the carbonaceous deposit forming species from the first plasma to provide said extant plasma, which comprises said inert gas and is substantially devoid of said carbonaceous deposit forming species, prior to performing said introducing step.

42. A thin film magnetic head comprising a layer having a pattern delineated using the ion beam etching method of claim 36.

43. The method according to claim 36, further comprising the step of bombarding the sample with a second ion beam extracted from said ion source containing said third plasma having said oxidizing species.

44. The method according to claim 43, wherein said first ion beam is directed at a first angle of incidence relative to a sample etched thereby, and wherein said second ion beam is directed at a second angle of incidence relative to the sample, said second angle of incidence not equal to said first angle of incidence.

45. The method according to claim 44, wherein said sample includes a first material and a second material, and said first angle of incidence is selected to enhance the selective etching of said second material relative to said first material.

46. The method according to claim 44, wherein said second angle of incidence is selected to enhance the selective removal of carbonaceous deposits capable of being formed on said sample during the bombardment by said first ion bean.

47. The method according to claim 44, wherein said first angle of incidence is less than about 45 degrees relative to a sample normal, and wherein said second angle of incidence is greater than about 60 degrees relative to the sample normal.

48. The method according to claim 43, further comprising the step of maintaining a plasma having said oxidizing species within said ion source after said second ion beam etching step is terminated.

49. The method according to claim 36, further comprising the step of bombarding the sample with a second ion beam extracted from a second ion source having a plasma containing an oxidizing species.

50. The method according to claim 49, wherein said first ion beam and said second ion beam bombard the sample during an overlapping time period.

51. The method according to claim 36, wherein said third plasma is maintained in the ion source for a period of time that is a factor of about 1.5 to about 2.5 greater than the period of time that said first plasma is resident in the ion source.

52. The method according to claim 36, wherein said sample includes a first material and a second material, and the beam energy of said first ion beam is selected to enhance the selective etching of said second material relative to said second material, said first ion beam including a species that is chemically reactive with said second material and substantially chemically nonreactive with said first material.

53. A process for ion beam etching of a substrate having a structure comprising a first layer and a second layer, said process comprising the steps of:
generating in an ion source a plasma including a species capable of forming carbonaceous deposits in said ion source;
impinging an ion beam extracted from said plasma onto said substrate to selectively etch said second layer at a rate greater than about two times the rate of etching said first layer, said ion beam having species that chemically react with a material included in said second layer; and
wherein said selectivity is substantially repeatable upon independent executions of said process.

54. The process according to claim 53, wherein said plasma is formed from a precursor gas, or precursor gas mixture, that includes at least one fluorocarbon gas.

55. The process according to claim 54, wherein said plasma is formed from a precursor gas mixture that includes a fluorocarbon gas and a noncarbon-containing hydrogen-containing gas.

56. The process according to claim 53, wherein said plasma is formed from a precursor gas mixture that includes a hydrocarbon gas and a noncarbon-containing fluorine-containing gas.

57. The process according to claim 53, wherein said first layer includes a material selected from the group consisting of NiFe, FeN, FeZN, FeTaN, CZT, Mn, Fe, Co, Ni, Cr, Ti, W, GaAs, GaN, AlGaAs, crystalline Si, amorphous Si, photoresist, polyimide, polymer, and elemental carbon allotropes.

58. The process according to claim 53, wherein said second layer includes a material selected from the group consisting of alumina, $SiO_2$, $Si_3N_4$, AlN, LiNO3, and ferroelectrics.

59. The process according to claim 53, wherein said plasma is formed from at least one precursor gas at least one of which is a fluorocarbon, said first layer includes permalloy, and said second layer includes alumina.

60. The process according to claim 59, wherein said fluorocarbon is CHF3.

61. The process according to claim 53, wherein said first layer is amorphous silicon and said second layer is SiO2.

62. The process according to claim 61, wherein said fluorocarbon based source gas includes CHF3, and said first ion beam selectively etches said SiO2 at a rate that is about twenty times greater than the rate that said first ion beam etches said amorphous silicon.

63. The process according to claim 53, wherein said first layer is Pt and said second layer is PZT.

64. The process according to claim 53, wherein said ion beam impinges on said sample at an incidence angle selected to substantially optimize the selectivity of etching said second layer relative to etching said first layer.

65. The process according to claim 53, further comprising the step of forming a second plasma in said ion source to remove carbonaceous deposits formed in the ion source by said plasma, said second plasma including an oxidizing species.

66. The process according to claim 65, wherein said second plasma is formed from at least one precursor gas at least one of which is selected from the group consisting of O2, N2O, NO2, and O3, and mixtures thereof.

67. A process for fabricating a thin film magnetic head, comprising the steps of:
forming a structure comprising a lower magnetic pole layer, a gap layer overlying the lower magnetic pole layer, and a patterned upper magnetic pole layer over the gap layer;
bombarding said structure with a first ion beam extracted from a first ion source, the first ion beam operative in etching the gap layer to expose a portion thereof; and
bombarding said structure, including the portion of the gap layer exposed by etching the gap layer, with a second ion beam that includes an oxidizing species.

68. The process according to claim 67, wherein said step of etching the gap layer with said first ion beam etches a fraction of the initial thickness of said gap layer, and further comprising the step, after said step of bombarding said structure with the second ion beam, of repeating said steps of etching the gap layer followed by bombarding said structure with the second ion beam at least until the entire thickness of the gap layer is etched.

69. The process according to claim 67, wherein said second ion beam is generated using said first ion source.

70. The process according to claim 69, wherein the first ion beam is generated using a first plasma produced using a fluorocarbon precursor gas, and said second ion beam is generated using a second plasma produced by introducing an oxidizing gas into the first plasma while the fluorocarbon precursor gas is eliminated.

71. The process according to claim 12, wherein the first ion beam is generated using a first plasma produced using a fluorocarbon precursor gas mixed with an an inert precursor gas, and said second ion beam is generated using a second plasma produced by introducing an oxidizing gas into an extant plasma that comprises species derived from the inert precursor gas and is substantially devoid of species derived from the fluorohydrocarbon precursor gas.

72. The method according to claim 71, further comprising the step of maintaining a plasma having oxidizing species derived from the oxidizing gas within the first ion source after the second ion beam etching step is terminated.

73. The process according to claim 67, wherein said second ion beam is generated using a second ion source that is independent of the first ion source.

74. The process according to claim 73, wherein said first and second ion beams impinge on said structure during an overlapping time period.

75. The method according to claim 73, further comprising the step of generating a plasma from an oxidizing precursor gas within the first ion source after terminating said first ion beam.

76. An ion beam etching method, comprising the steps of:
bombarding a sample with a first ion beam extracted from an ion source that has a first plasma comprising a carbonaceous species; and
introducing, after said first ion beam etching step has been initiated, an oxygen containing gas into an extant plasma of the ion source to provide a third plasma in said ion source, said third plasma having oxidizing species derived from said oxygen containing gas, and wherein said ion source contains a plasma continuously in time between said first plasma and said extant plasma.

77. The method according to claim 76, wherein said first plasma is derived from at least one fluorocarbon precursor gases.

78. The method according to claim 76, wherein said extant plasma is said first plasma.

79. The method according to claim 78, wherein during said introducing step, said carbonaceous species is eliminated from the extant plasma.

80. The method according to claim 76, wherein said first plasma includes an inert gas species, and further comprising the step of eliminating the carbonaceous species from the first plasma to provide said extant plasma, which comprises said inert gas and is substantially devoid of said carbonaceous species, prior to performing said introducing step.

81. The method according to claim 76, further comprising the step of bombarding the sample with a second ion beam extracted from said ion source containing said third plasma having said oxidizing species.

82. The method according to claim 81, further comprising the step of maintaining a plasma having said oxidizing species within said ion source after said second ion beam etching step is terminated.

83. The method according to claim 76, further comprising the step of bombarding the sample with a second ion beam extracted from a second ion source having a plasma containing an oxidizing species.

84. The method according to claim 83, wherein said first ion beam and said second ion beam bombard the sample during an overlapping time period.

85. A process for ion beam etching of a substrate having a structure comprising a first layer and a second layer, said process comprising the steps of:

generating in an ion source a plasma that includes a carbon-containing species;

impinging an ion beam extracted from said plasma onto said substrate to selectively etch said second layer at a rate greater than about two times the rate of etching said first layer, said ion beam having species that chemically react with a material included in said second layer; and wherein said selectivity is substantially repeatable upon independent executions of said process.

86. The process according to claim 85, wherein said plasma is formed from a precursor gas, or precursor gas mixture, that includes at least one fluorocarbon gas.

87. The process according to claim 86, wherein said plasma is formed from a precursor gas mixture that includes a fluorocarbon gas and a noncarbon-containing hydrogen-containing gas.

88. The process according to claim 85, wherein said plasma is formed from a precursor gas mixture that includes a hydrocarbon gas and a noncarbon-containing fluorine-containing gas.

89. The process according to claim 85, further comprising the step, after generating said plasma, of forming a second plasma that includes an oxidizing species.

\* \* \* \* \*